(12) United States Patent
Ruparelia et al.

(10) Patent No.: US 7,082,540 B1
(45) Date of Patent: Jul. 25, 2006

(54) SYSTEM AND METHOD FOR TRACKING PROGRAMMABLE DEVICES THAT USE INTELLECTUAL PROPERTY

(75) Inventors: Nilam Ruparelia, San Jose, CA (US); Deepak Sharma, San Jose, CA (US)

(73) Assignee: Cypress Semiconductor Corp., San Jose, CA (US)

( * ) Notice: Subject to any disclaimer, the term of this patent is extended or adjusted under 35 U.S.C. 154(b) by 803 days.

(21) Appl. No.: 10/008,946

(22) Filed: Nov. 2, 2001

(51) Int. Cl.
*G06F 11/30* (2006.01)
*G06Q 99/00* (2006.01)
*H04K 1/00* (2006.01)
*H04L 9/00* (2006.01)

(52) U.S. Cl. .......................... 713/193; 705/57; 705/58; 705/59

(58) Field of Classification Search ................ 713/189, 713/193; 705/57, 58, 59; 716/17, 16
See application file for complete search history.

(56) References Cited

U.S. PATENT DOCUMENTS

| 5,761,483 A | 6/1998 | Trimberger |
| 6,215,689 B1 | 4/2001 | Chhor et al. |
| 6,629,309 B1 * | 9/2003 | Allen, III .................... 716/16 |
| 6,904,527 B1 * | 6/2005 | Parlour et al. ............... 713/189 |

OTHER PUBLICATIONS

Animi et al., Artisan Components Free IP Business Model, Jun. 3, 1999, pp. 4-7.*

* cited by examiner

*Primary Examiner*—Gilberto Barrón, Jr.
*Assistant Examiner*—Kristin M. Derwich
(74) *Attorney, Agent, or Firm*—Kevin L. Daffer; Daffer McDaniel, LLP

(57) ABSTRACT

A system and method is provided for tracking royalty obligations of a user of intellectual property. The intellectual property can perform program code being sent to a user of a programmable device. The program code is used to configure the programmable device to the functionality of a design owned by an intellectual property vendor. The intellectual property vendor can send an identifier with the code and the programmable device manufacturer can send an embedded code with the shipped, programmable device. The user, when programming the device, will compare the identifier within the code to the embedded code and, if a match results, the user will know that the program contains valuable intellectual property. For each device being programmed with such intellectual property, a computation can occur and the number of thusly programmed devices can be maintained within a resulting royalty payment table. The royalty payment table can be temporarily stored in a host which programs the device at the user site, and can be periodically downloaded across the internet or other means to the device manufacturer, who then forwards the appropriate payments to one or more intellectual property vendors.

9 Claims, 7 Drawing Sheets

| IP VENDOR | DEVICE # | IP CAT. | IP ID | # OF PROG. DEV. |
|---|---|---|---|---|
| A | 1 | HIGH | 23 | 10,000 |
| B | 1 | LOW | 12 | 15,000 |
| A | 2 | LOW | 12 | 40,000 |
| B | 1 | LOW | 12 | 50,000 |
| A | 1 | HIGH | 25 | 100,000 |

SYSTEM AND METHOD FOR TRACKING PROGRAMMABLE DEVICES THAT USE INTELLECTUAL PROPERTY

BACKGROUND OF THE INVENTION

1. Field of the Invention

This invention relates to programmable logic devices and, more particularly, to a system and method for logging use of intellectual property by a user of programmable circuits, systems or devices, and for notifying a vendor of the programmable logic of such use. The system advantageously logs the number of programmable units being programmed. The information logged may be used for multiple purposes, one of which is to track royalty obligations due to the intellectual property owner.

2. Description of the Related Art

The following descriptions and examples are not admitted to be prior art by virtue of their inclusion within this section.

Programmable logic devices (PLDs) are commonly used to implement a vast array of logic networks. PLDs are general-purpose digital components which are manufactured in a non-programmed state and are later programmed to implement a desired logical function. The desired function can be any configuration that is used to carry out a subsystem operation preferred by a user.

There are numerous types of PLDs depending on the configuration and how the PLDs can be programmed. Most PLDs can be categorized as circuit logic that can either retain its programmed state or will lose its programmed state after power is removed. A PLD can include an array of programmable cells that are either volatile or non-volatile. Examples of different types of PLDs include programmable read-only memories (PROMs), field programmable logic arrays (FPLAs), programmable array logic devices (PALs), field programmable gate arrays (FPGAs), and complex programmable logic devices (CPLDs).

A PLD and all the aforementioned derivatives (FPGAs, FPLAs, etc.) are one example of a device that can be programmed by a user for a specific application. However, the intended purpose of the present device is not to be limited to a PLD or its derivatives. Nor should the intended purpose be limited to a single chip or device on a single packaged product. Instead, any circuit, subsystem, or multiple circuits or subsystems that can be programmed by a user for a specific purpose is defined as a programmable device.

If a programmable device implements an array of cells, the cells can be arranged as switches that are programmed after the particular logic function of the programmable device has been prepared and checked using a computer-aided design package appropriate for the programmable subsystem family being used. As such, the programmable device can involve a logic block containing an array of programmable switches which either retain their programmed state (non-volatile) or lose their programmed state (volatile) if power is removed. Regardless of whether the array can be programmed as a volatile or non-volatile array, in most instances, the array is programmed at the user's site.

A user having a defined design in mind will generally purchase an unprogrammed programmable device from a manufacturer. In instances where the programmable device is a PLD, the user can purchase the programmable device from Cypress Semiconductor. The programmable device may be stockpiled by the user and, when a design is needed, the programmable device can be programmed in the field using, for example, a program tool containing program code.

The program tool can be a computer, or a portion of a computer, which stores a program that selectively activates or deactivates switches within the array of switches of the programmable device. The program, thereby, essentially contains the overall design template needed to configure the programmable device to a user-specified design. There are numerous types of program tools and programs/files resident on such tools, all of which are contained within a host computer, typically at the user or customer site. Of course, the programmable device can be a portion of a subsystem that can be programmed to implement a particular application, such as a bus bridge, media access controller (MAC), or virtually any system that can be configured, or periodically upgraded to new applications by a user.

One exemplary application is when a designer wishes to test a design. In these instances, a designer might purchase a programmable device and configure the device at the user site. The designer will receive the programmable device from the programmable device vendor and will program the programmable device at the site using a program the designer received either directly or indirectly from a company that owns the design. For example, a designer may wish to implement a counter. Instead of designing a counter from scratch, the designer will simply purchase a programmable device and program the programmable device in accordance with program code he/she obtains from the company that owns the counter design to be configured on that programmable device.

The owner of the design can therefore send a file of that design to a user who then executes that file within the user's host in order to program the programmable device. The entity which owns the design charges a licensing fee or royalty fee to the user who acquires the program. The design owner will not know how many programmable devices will be programmed and, therefore, typically charges a flat royalty fee for that design regardless of the number of programmable devices being programmed. This places a substantial burden on a designer who wishes only to test his or her design. In other words, a user may only wish to program one or two programmable devices to determine the viability of a design specification. Nonetheless, the owner of the design will require a fairly large royalty payment in order for the user to have access to the program.

Most users of programmable devices expect a low initial investment in the development of their designs, yet are willing to pay royalty fees only if those fees can be distributed among the programmable devices being programmed. A user may not choose to pay, for example, a $10,000 royalty fee if he/she only wishes to program one programmable device. However, if 10,000 programmable devices are to be programmed, the user is more likely to accept a $1 royalty fee per each programmed programmable device. In addition to benefits to the user, an intellectual property (IP) vendor also benefits. The IP contained in the IP being programmed into the programmable device is more likely to be used on a much larger quantity of products if the royalty obligations due to the IP vendor can be spread among each of those devices. The IP vendor design will therefore be more widespread in its use.

As used herein, intellectual property (IP) refers to ideas embodied into designs submitted by an owner of such ideas to a programmable device user. The ideas include anything that can be covered by patents, copyrights or trademarks, and/or anything that is protected by the IP vendor, and offered for value to a user. In return for submitting software containing a design bearing the IP of a vendor, the IP vendor will expect to receive royalty fees either directly or indirectly from the user. Thus, if a user wishes to update his or her MAC, the user can seek software that will reconfigure the MAC and, in return will have a royalty obligation to the IP vendor who sends the software necessary to reconfigure the user's MAC.

It is desirable to implement a system and methodology that minimizes the owner of the design (i.e., the IP vendor) from having to charge a high one-time royalty fee to a customer. The desired system and method beneficially tracks royalty fees among numerous programmed programmable devices so that the overall royalty can be disseminated amongst the programmed programmable devices. This will enhance the use of programmable devices in testing potential designs without suffering exorbitant one-time royalty fees.

SUMMARY OF THE INVENTION

The problems outlined above are in large part solved by an improved system and method for tracking royalty fees to programmed subsystems, alternatively known as programmable devices. Each time a programmable device is programmed with code obtained from an IP vendor, the program tool of the host will note use of the IP and log such use within an accumulator. The accumulator, found within a data retrieving engine of the host, will store and periodically update a royalty payment table attributable to the programmable devices being programmed with the corresponding IP. The table can be sent either electronically or by other means to the manufacturer of the programmable device. The manufacturer will then be obligated to pay the IP vendor or owner of the design in accordance with that royalty payment table. The table can be downloaded either daily, weekly, monthly, etc. from the programmable device user to the programmable device manufacturer. The table may contain royalty obligations due to several IP vendors, depending on the design used. The programmable device manufacturer can build into the cost of the programmable device any royalty fees he/she must pay to the IP vendor in accordance with a pre-existing licensing agreement. According to an alternative embodiment, the programmable device manufacturer might simply forward the royalty payment table to the IP vendor, but does not collect royalties from the user. Instead, the IP vendor will seek collection directly from the user based on information contained in the table.

The programmable device manufacturer or vendor is instrumental in either notifying the IP vendor of the user's payment obligations or the programmable device manufacturer's payment obligations. However, a mechanism is needed to discern whether IP is contained within the program code. In order to solve this problem, the IP manufacturer can place an embedded IP identification number into the programmable device as it is manufactured. The embedded code comprises a sequence of bits whose values symbolize one or more designs that bear a royalty fee. For example, a counter which performs a certain counting function may be the IP of the vendor that warrants a specific royalty fee. Code which symbolizes a counter design or a specific MAC identifier can, therefore, be embedded into the programmable device to note that whenever the program forwarded to the user implements that counter design, software IP identification within that program will match with the embedded code. That match will be noted within the host. There may be numerous counter designs being implemented and, therefore, an accumulator within a data retrieving engine of the host will accumulate the number of designs each time a counter is programmed, along with the royalty fees due the IP vendor for each counter design. The accumulation of programmed counter designs, royalty fees per counter, IP vendor name, and an indicator of that counter design are forwarded to the programmable device manufacturer and/or the IP vendor in the form of the royalty payment table.

According to one embodiment, a programmable logic device is provided. The device comprises a comparator for comparing embedded code upon the device with a software identifier placed within a program used to program that device. The results of the comparison function are used to determine whether, when the device is programmed, the device is configured to fall within or outside of the scope of one or more license obligations. Those license obligations are attributable to a user or, if the programmable device manufacturer agrees, are attributable to the programmable device manufacturer. The embedded code is preferably unalterable by the user of the device and is placed within the device before the device is shipped to the user or customer.

According to another embodiment, a host computer is provided. The host computer comprises a programming tool adapted to program a plurality of programmable logic devices. The host computer also includes a data retrieving engine that is adapted for coupling to the device. The data retrieving engine compiles a file if a software identifier forwarded from the programming tool matches code embedded within the device. The file preferably comprises a royalty payment table attributable to the plurality of devices after such devices are programmed to take on functionality that falls within one or more license obligations.

According to yet another embodiment, a method is provided for tracking royalty obligations. The method includes compiling code that signifies a licensing arrangement requiring such royalty obligations between a vendor of IP and a user of IP. The code is forwarded from the vendor to a manufacturer of a programmable logic device, where the manufacturer can then embed the code into the device. The device is then shipped with the embedded code to a user of the device. The device can then be programmed by the user with a program containing a software identifier. If the software identifier compares favorably to the embedded code, then a match is noted and the programming of the device can continue. If a match does not exist, then the device cannot be programmed and a royalty payment table cannot be generated.

BRIEF DESCRIPTION OF THE DRAWINGS

Other objects and advantages of the invention will become apparent upon reading the following detailed description and upon reference to the accompanying drawings in which.

Figure 1:
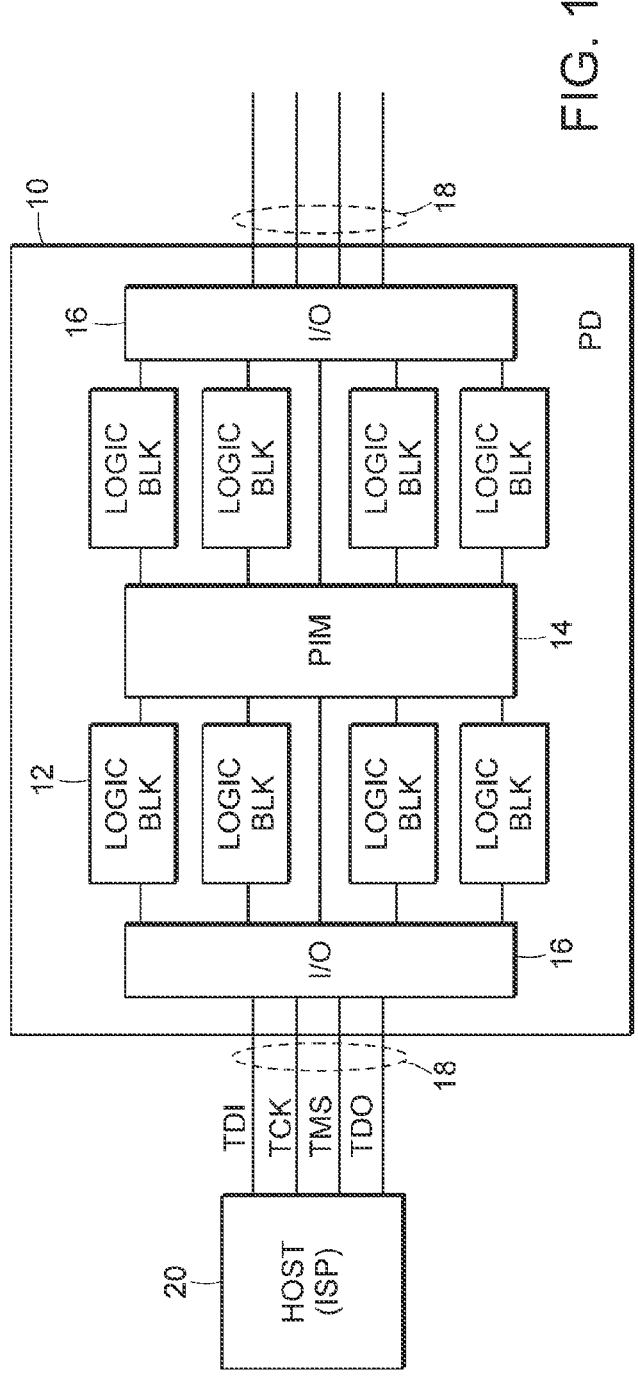
FIG. 1 is a block diagram of a programmable device that can be programmed from a host computer bearing an in-system programming tool.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

Turning now to the drawings, FIG. 1 illustrates a certain type of programmable device 10. Programmable device 10 may entail numerous interconnected circuit or subsystem blocks. Device 10 can be not only a single integrated circuit, but multiple integrated circuits interconnected to form a subsystem. Moreover, the programmable device may be considered a highly integrated interconnection of multiple programmable devices. The terms programmable device, therefore includes any subsystem that can be programmed by a user after receiving the device (i.e., subsystem) in an unprogrammed state. One form of such a device is a CPLD, FPLA, PAL, FPGA, or any logic which may be programmed at the user's site is henceforth referred to as a programmable device 10, regardless of its configuration or use.

Programmable device 10 includes multiple logic blocks 12 interconnected with a programmable interconnect matrix (PIM) 14. The number of logic blocks 12 within a complex programmable device ranges anywhere from two to beyond 16. Communication to and from the single monolithic substrate that embodies programmable device 10 takes place over pins 18 operably coupled to input/output cells 16.

Programmable device 10 can be programmed and/or tested through, for example, a serial port. In the early 1990s a standard was developed and approved as IEEE Std. 1149.1, henceforth referred to as the Joint Test Action Group (JTAG) standard. The JTAG standard was envisioned to allow testing of an integrated circuit after, for example, it had been assembled onto a printed circuit board. The JTAG standard was broadened to allow, for example, programming of programmable circuits in the field. The advantage of the JTAG standard is that only four input pins are needed to test and/or program a circuit. Those pins are shown in FIG. 1 as the serial input pin (TDI), serial output pin (TDO), the clock pin (TCK), and the mode select pin (TMS). A programmable device being programmed can, therefore, receive a serial bitstream of program code across the TDI pin clocked in accordance with TCK frequency. A JTAG test access port (TAP) on the integrated circuit can be used to recognize and accept the serial bitstream. It is appreciated that although the JTAG input mechanism is shown, it is recognized that any serial bitstream, placed in any format, can be used to program a programmable device. A serial bitstream configured in JTAG or JEDEC format is only one example by which program code can be fed into the programmable device.

A computer or host 20 can be coupled to programmable device 10 to program programmable device functionality. Host 20 includes any subsystem that can store a program and can send that program preferably in serial fashion to an integrated circuit, such as programmable device 10. Host 20, thereby, may include an execution unit which can execute code based on certain application programs stored within a memory media of host 20. For example, a popular programming language used to program a programmable device and which can be executed from host 20, includes any in-system (ISP) programming language. One type of programming language useful on, for example, a complex programmable device, such as the Flash 370 products offered by Cypress Semiconductor, is a very high-speed integrated hardware description language (VHDL) software that describes and simulates hardware designs from transistor level up to a full-system level. A popular VHDL that follows the IEEE Std. 1076 is Cypress Semiconductor's Warp programmable device design tools. Another popular program based on JTAG-compliant standards is the JAM Standard Test and Programming Language (STAPL). STAPL consists of source code that is executed directly from the interpreter program, without being first compiled into binary executable code. Information regarding the STAPL can be obtained from Altera Corp., San Jose, Calif.

Regardless of the programming language used, host 20 can execute from that programming language and place the appropriate encoded bit values upon the bitstream to program volatile or non-volatile switches within logic block 12. Each logic block 12 will hereinafter be described as an array of switches that are programmed from a programming tool such as Warp or JAM loaded within host 20. The programming tool executes from a file sent from the owner of a particular design. That file, when executed upon, will program the appropriate switches within the array of switches of the specified logic block 12 to form whatever design is contained within that file.

Figure 2:
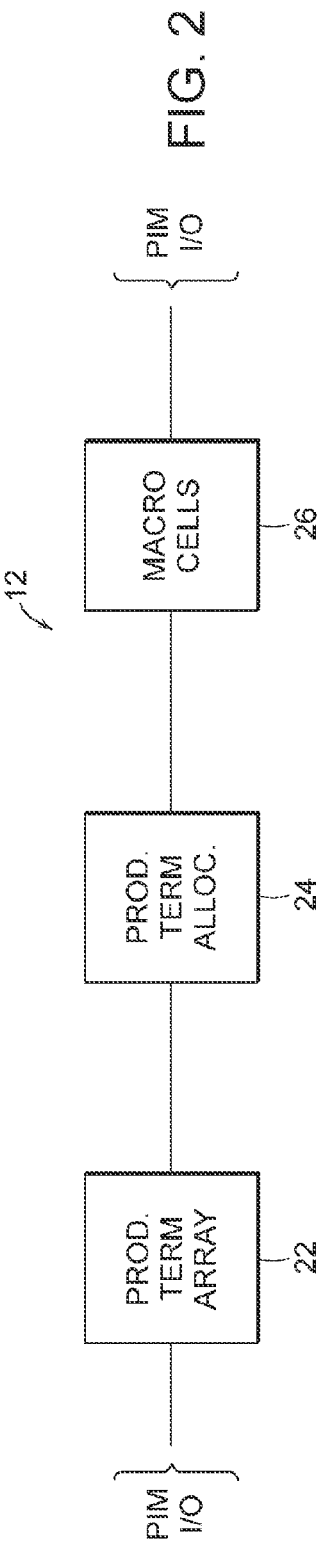
FIG. 2 is a block diagram of an exemplary logic block as shown in FIG. 1.

FIG. 2 illustrates further details of an exemplary logic block 12. According to the example shown, logic block 12 can comprise a product term array 22, a product term allocator 24, and macro cells 26. Inputs to product term array 22 can arrive from either the programmable interconnect matrix 14 or the input/output cell 16 (shown in FIG. 1). The product term allocator 24 receives the product term from array 22, and allocates or routes that product term to different macro cells 26 depending upon where they are needed. Product term allocator 24 may include an array of volatile or non-volatile memory cells which operate as switches. Macro cells 26 accepts the single output of the product term allocator 24, wherein the product term allocator 24 ORs the variable number of product terms arising from array 22. Depending on the architecture used, macro cells 26 can be configured as a flip-flop, synchronous, or asynchronous logic, inverting or non-inverting logic, or any other logic function. The output from macro cells 26 can be fed either to the programmable interconnect matrix 14 or the input/output macro cell 16. Further details of logic block architecture and, specifically, items 22, 24, and 26 can be obtained in reference to Cypress Semiconductor Corp., part no. CY370 family, or FLASH 370™.

Figure 3:
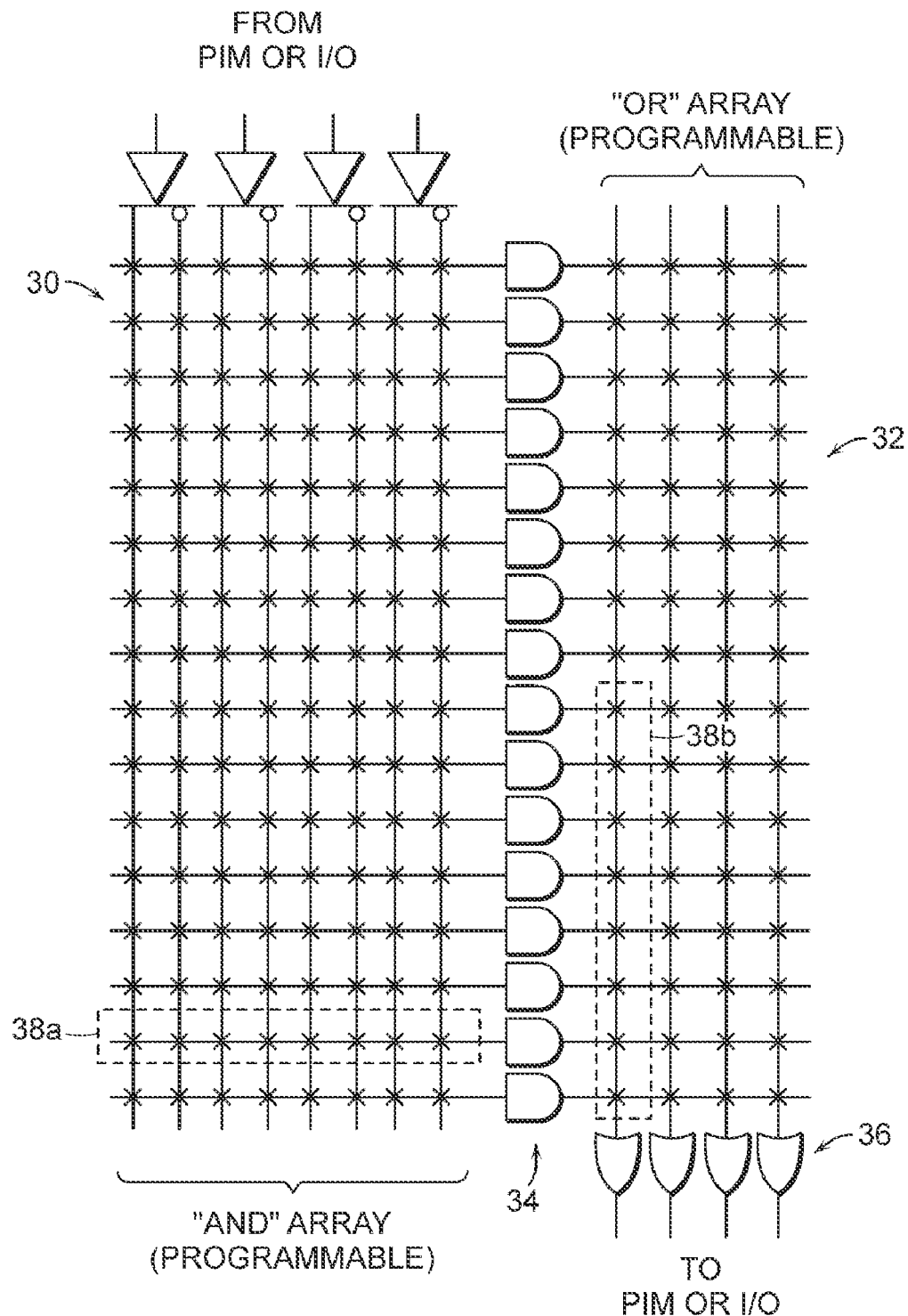
FIG. 3 is a circuit diagram of an array of programmable logic cells of an exemplary product term array and product term allocator of FIG. 2, with possibly a portion being reserved to receive an embedded IP identifier.

FIG. 3 illustrates in further detail product term and sum term array 30 and 32, respectively. In particular, product term arrays are generally known as a matrix of input and output conductors programmable at the interconnection there-between. The output conductors can be fed into an AND array 34 to encompass a product term array 30. Output from the product term array 30 can be fed into a sum term array or an OR array 32, if desired. The sum term array is classified as such based on the output conductors feeding into OR gates 36.

The product term array 22 (shown in FIG. 2) may be implemented as array 30 with AND gate outputs 34 (shown in FIG. 3). Product term allocator 24 (shown in FIG. 2), however, can encompass the sum term array 32 (shown in FIG. 3). It important to note that the array of memory cells need not necessarily be a product array. Instead, the array can be a sum array or a combination of product and sum terms, depending on the desired degree of programmability. At the cross-over points, an "x" is shown to indicate the cross-over connection may or may not be made, depending on whether the switch is programmed or not. Regardless of the form taken, it is generally desired that the array be non-volatile. In order that the programmable device not lose its programmed state when power is lost, each cross-point is preferably a fuse, anti-fuse, or EEPROM cell. Moreover, preferably, the matrix of memory cells can constitute a flash EEPROM. Flash EEPROMs are advantageous if fast arrays and high density application are desired. A flash EEPROM cell is generally a single transistor comprising a control gate dielectrically spaced above a floating gate. The floating gate receives programmed charge and maintains that charge over a relatively long period of time (e.g., approximately 10 years or longer).

It is advantageous that a portion of the array be set aside and permanently programmed. That portion can be anywhere within the array, and is shown in phantom as item 38a and/or 38b. Portions 38 may be made different from the other programmable switches within the array. For example, portions 38 can be fashioned by the programmable device manufacturer with a metal line present or absent, or contacts present or absent to program the cross-point switches as the programmable device is made. Once programmed during its manufacture, the programmable device portions 38 cannot be changed later during user programming via, for example, a host executing VHDL at the user's site. Thus, portions 38 are inaccessible to the customer and cannot be altered. The phantom lines indicate only in the abstract that a portion can be set aside and permanently programmed by the manufacturer, and is not intended to suggest that only the locations shown can be programmed or that, possibly, other areas outside the array can be programmed to serve the same function as programmed portions 38.

Portions 38 are programmed to contain embedded code sent from the owner of the design (i.e., the IP vendor) to the programmable device manufacturer. The programmable device manufacturer will then embed the code into a portion of the array or, possibly, somewhere else outside the array so that when the user of the programmable device eventually programs the programmable device, the embedded code will be used to discern whether the program contained IP matching that of the embedded code.

Figure 4:
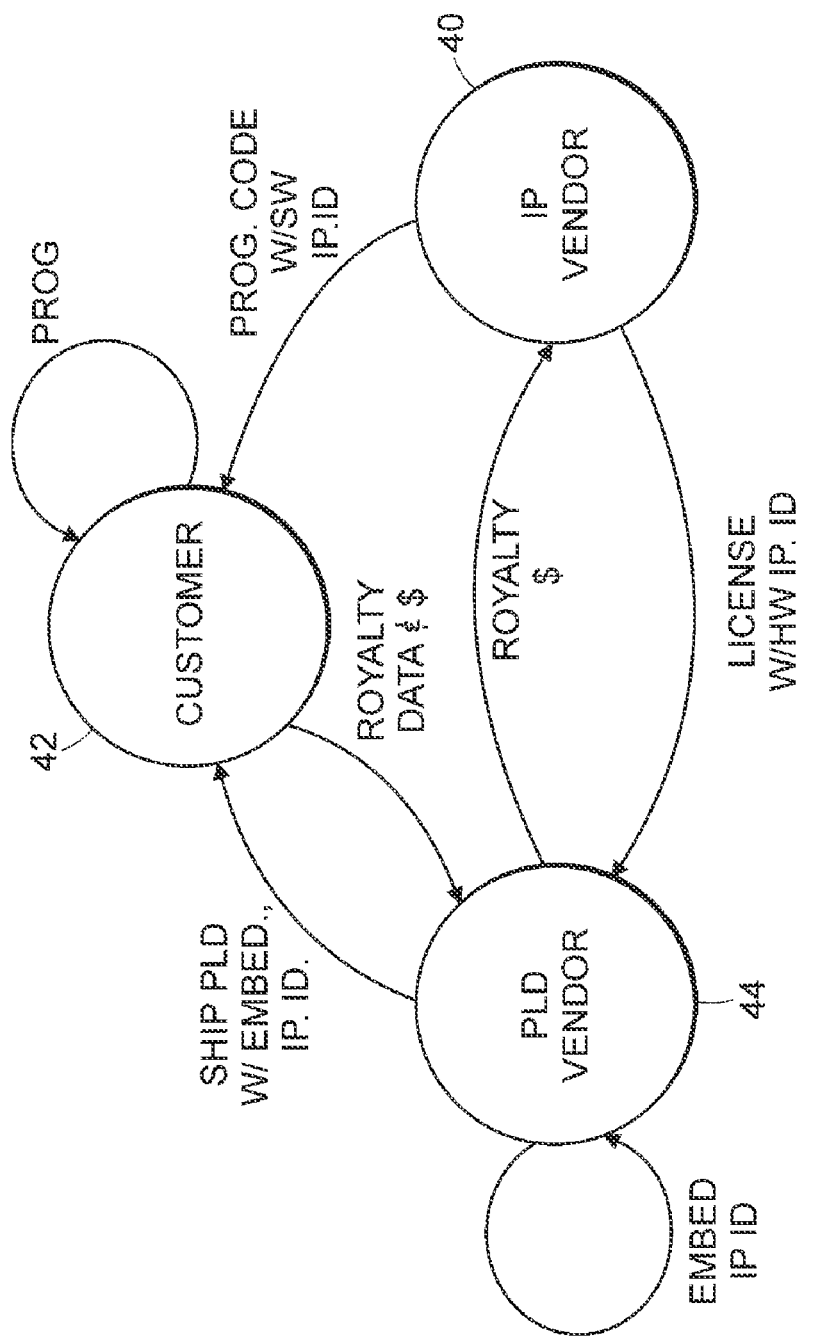
FIG. 4 is a state diagram of three entities involved in the manufacture, sale, use and programming of a programmable device.

FIG. 4 illustrates the overall programmable device business and traces the manufacturing, programming, use, and payment for such use of a programmable device. Generally speaking, a design of a particular logic function (e.g., a counter), is derived by an IP vendor 40. The IP vendor owns the rights to that design and wishes to recoup his/her investment by selling that design to a customer 42 of a programmable device product. As such, IP vendor 40 will ship software containing programming code of that design to customer 42 in hopes that customer 42 will pay for that IP. To ensure payment in accordance with the present embodiments, IP vendor 40 ships with the code a software identifier (SW IP ID). Customer 42 can then program the programmable device with the program code to formulate the design offered by IP vendor 40.

In order to ensure IP vendor 40 gets paid since vendor 40 will not know necessarily how many programmable devices get programmed, IP vendor 40 will wish to track the number of programmable devices being programmed, and the royalty rate for each IP being offered. Accordingly, IP vendor 40 works out a license with programmable device vendor 44, where programmable device vendor 44 will receive a license and, for the various programmable devices that it chooses to manufacturer, will also receive a hardware identifier (HW IP ID). In return, programmable device vendor 44 promises to pay certain royalties for use of the hardware identifier to IP vendor 40.

Once programmable device vendor 44 receives the hardware identifier, vendor 44 embeds the hardware identifier into each programmable device as the programmable device is manufactured. The embedded code can be placed either during the mask shop manufacturing process, or can be permanently placed into the manufactured programmable device using, for example, blown fuses or anti-fuses. Regardless of how the code is embedded, the resulting embedded code cannot be changed by a customer 42 and, as such, vendor 44 ships the programmable device with the embedded code, satisfied that customer 42 cannot access that embedded code nor alter its bit values.

Customer 42 will then stockpile the programmable devices and, whenever customer 42 desires to test a subsystem, he/she will program one or more programmable devices with the program sent from IP vendor 40. If the software IP ID contained within the file of that program matches the embedded code within the unprogrammed programmable device, then it is determined that the program code contains one or more IPs. For each device being programmed, the IP is logged, royalty rates, and IP vendor names, etc. are placed in a file or table known as a royalty payment table provided, of course, a match exists between the software IP identifier and the embedded IP identifier for each programmed device. Regardless of who makes the payment, IP vendor 40 will be assured that when each device is programmed, the host performing the program will compile a royalty log and the royalties will be spread out on a per-device basis. This helps ensure customers will freely use a programmable device and not suffer the burdens of having to pay a one-time royalty payment, regardless of the number of programmable devices being programmed. This, in essence, spreads out the royalty payments to relatively small incremental payments to encourage customer use of IP contained within the program code.

Figure 5:
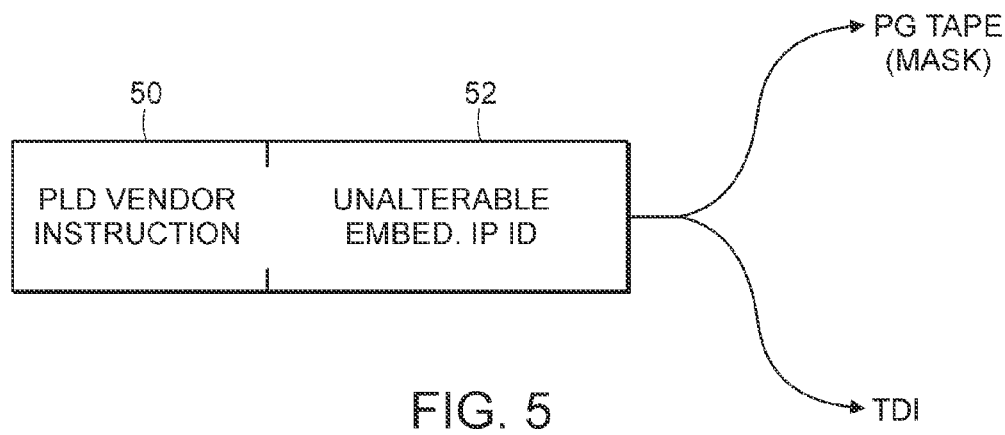
FIG. 5 is a block diagram of an embedded IP identifier being placed into a portion of the programmable device inaccessible to and/or unalterable by a programmable device user or customer, wherein the embedded IP identifier is configured in the mask used to form the programmable device or is forwarded to the programming input port to permanently form connections and disconnections in the programmable device.

FIG. 5 illustrates two different mechanisms by which hardware IP identification can be embedded into the programmable device by the programmable device vendor. The IP vendor can send the code to the programmable device vendor. The programmable device vendor will then place an instruction 50 with the to-be-embedded code 52 to either place the code into the pattern generation (PG) tape of a mask used to form the device on silicon, or place the code into a serial input port of an already formed device on silicon. If placed into the PG tape, metal may appear or be omitted in the critical locations, or contacts may appear or not appear in the critical locations to form the programmed connection similar to, for example, a read-only memory (ROM). For example, a contact can be placed where it is needed to connect a switch outcome to a binary 1 or binary 0 depending on the presence or absence of that contact. The same can be said for the presence or absence of a metal either existing or not existing above the contact. Placement of contact features and metal features occur depending on whether such features appear on the mask used to form the corresponding layer. If the embedded IP ID 52 is to be programmed after the programmable device is formed by the programmable device vendor, programming can occur by simply forwarding a sufficient voltage or current to blow a fuse or form an anti-fuse. Once the connection is formed, it cannot be altered later by a customer.

Figure 6:
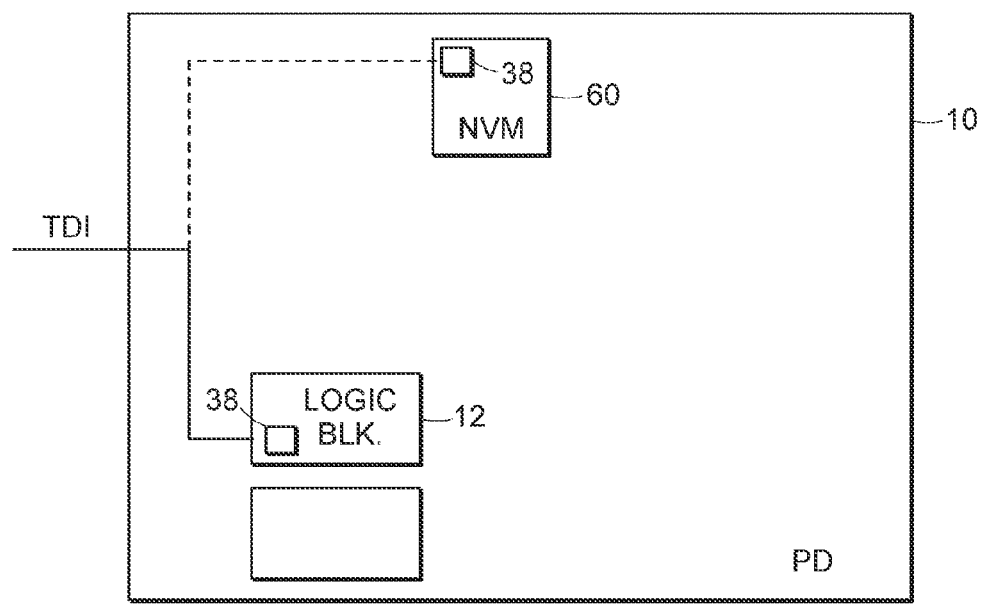
FIG. 6 is a block diagram of a programmable device receiving the embedded IP identifier through programming input port to either a portion of the programmable logic cells of FIG. 3, or a portion of a non-volatile memory, both of which are inaccessible to and unalterable by a programmable device user/customer.

FIG. 6 illustrates various ways in which the hardware IP identifier can be embedded into programmable device 10 during a permanent programming operation. For example, if the programmable device vendor did not manufacture via masks the programmable device with the embedded code, the manufacturer could simply program the embedded code after the manufacturing process by serially feeding the code into an input port (e.g., TDI). According to one example, the embedded code can be placed into one or more logic blocks 12. Specifically, a reserved portion inaccessible to a user can be chosen to receive the embedded code. This can occur by either masking off an instruction or an address at which data is placed or, alternatively, once the embedded code is programmed, no changes can be made within that portion by a user even though the user might be able to access that portion. Alternatively, the hardware IP identifier can be embedded into a portion of programmable device 10 separate from logic block 12. According to one example, the portion can be that of non-volatile memory 60. The non-volatile memory may be any memory that will sustain its programmed state even after power is removed from the programmable device 10. Preferably, the portion of non-volatile memory 60 receiving the embedded code cannot be addressed by a user during a write operation. The embedded code is shown placed in portions 38 of logic block 12 and/or non-volatile memory 60.

Figures 7, 8:
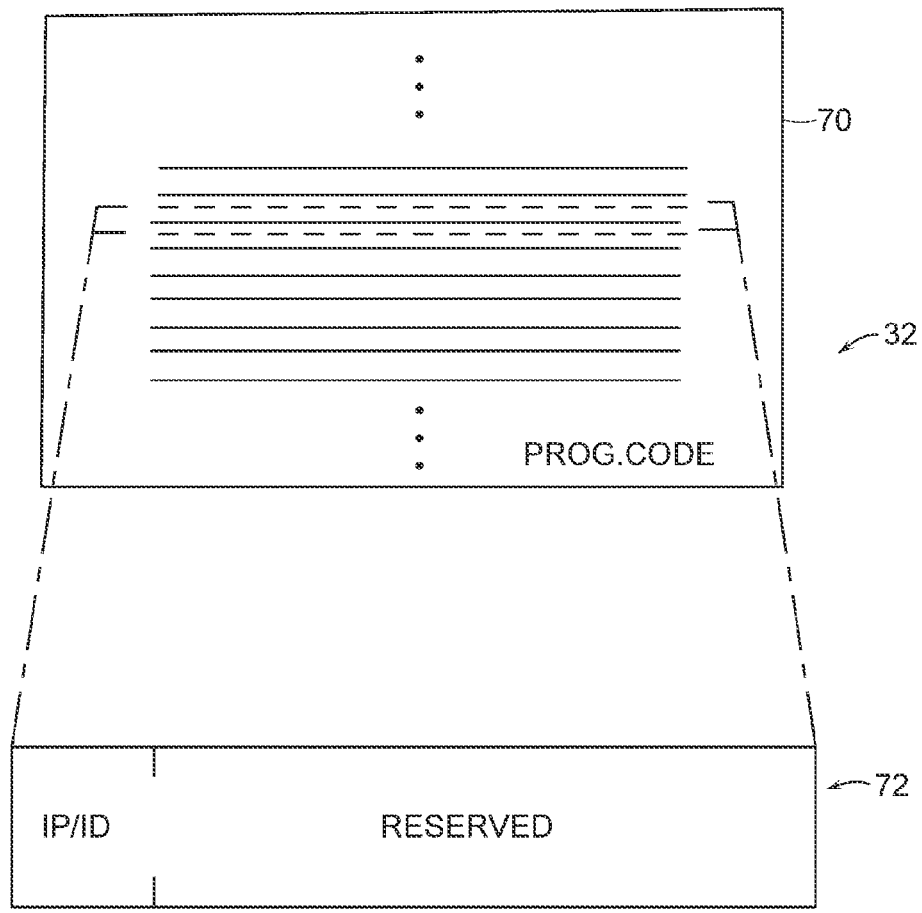
FIG. 7 is a listing of program code containing several fields, each field can receive bits of data identifying the IP vendor who provided the program code, the device that is being programmed, the category of IP, and a software IP identifier.
FIG. 8 is a table of exemplary values placed in an accumulator of a data retrieving engine of the host to indicate not only the values within the program code fields, but also the accumulated values applicable to royalty calculations of devices programmed with various royalty-bearing IPs.

FIG. 7 illustrates a sequence of program code 70 sent from an IP vendor to a customer. Contained within program code 70 is a software IP identifier 72 shown in detail. The software IP identifier represents some feature of the hardware description language used to describe and program a logic function that is the property of an IP vendor. It may be that a certain portion of that code can be readily identified and, therefore, attributed to the software IP identifier. For example, a counter requires a sequential combination of logic functions triggered from a rising or falling edge of a clock signal. A modulo 10 counter triggers a new count after a specified period of time. Thus, a modulo 10 counter may have certain attributes of the code noting that time expiration which could be used as the software IP identifier. Correspondingly, that snippet of code can also be used as the hardware IP identifier previously sent to the programmable device vendor which embeds the hardware IP identifier into the programmable device.

FIG. 8 illustrates a royalty payment table 80. Table 80 shows certain examples of values which can be placed in table 80 as a result of programmed devices where the software IP identifier matches the hardware IP identifier. If a match occurs, each programmed device will yield the number of devices programmed in accordance with a certain IP identifier, and the IP identifier may have a specific category of royalties due. Table 80 may also be used to indicate the name of the IP vendor and the programmable device number that is being programmed.

Merely as an example, line 82 indicates that an IP vendor designated as "A" sent program code containing an IP identification number of "23" to a customer. The customer programmed 10,000 devices with IP identifier 23, known to the IP vendor as carrying a high royalty rate, as shown in the IP category HIGH. For example, the device being programmed can be a certain part number and, in this case, is noted as device number "1." Either the program code can contain the IP vendor name, device number, and IP category, along with the IP Identifier or, simply, the IP vendor sends a file which can be compiled whenever a match occurs between the software IP Identifier and the hardware IP identifier. Once that match occurs, then the file completes its compilation process by filling in the table 80, as shown. As stated above, the IP identifier indicates the particular design to which an IP vendor has placed a royalty obligation. For example, IP identifier 23 can be that of a counter while IP identifier 12 can be that of a D type flip-flop. Given that a counter is more complex, the IP category attributable to IP Identifier 23 can have a much higher royalty rate than that of a D type flip-flop.

Figure 9:
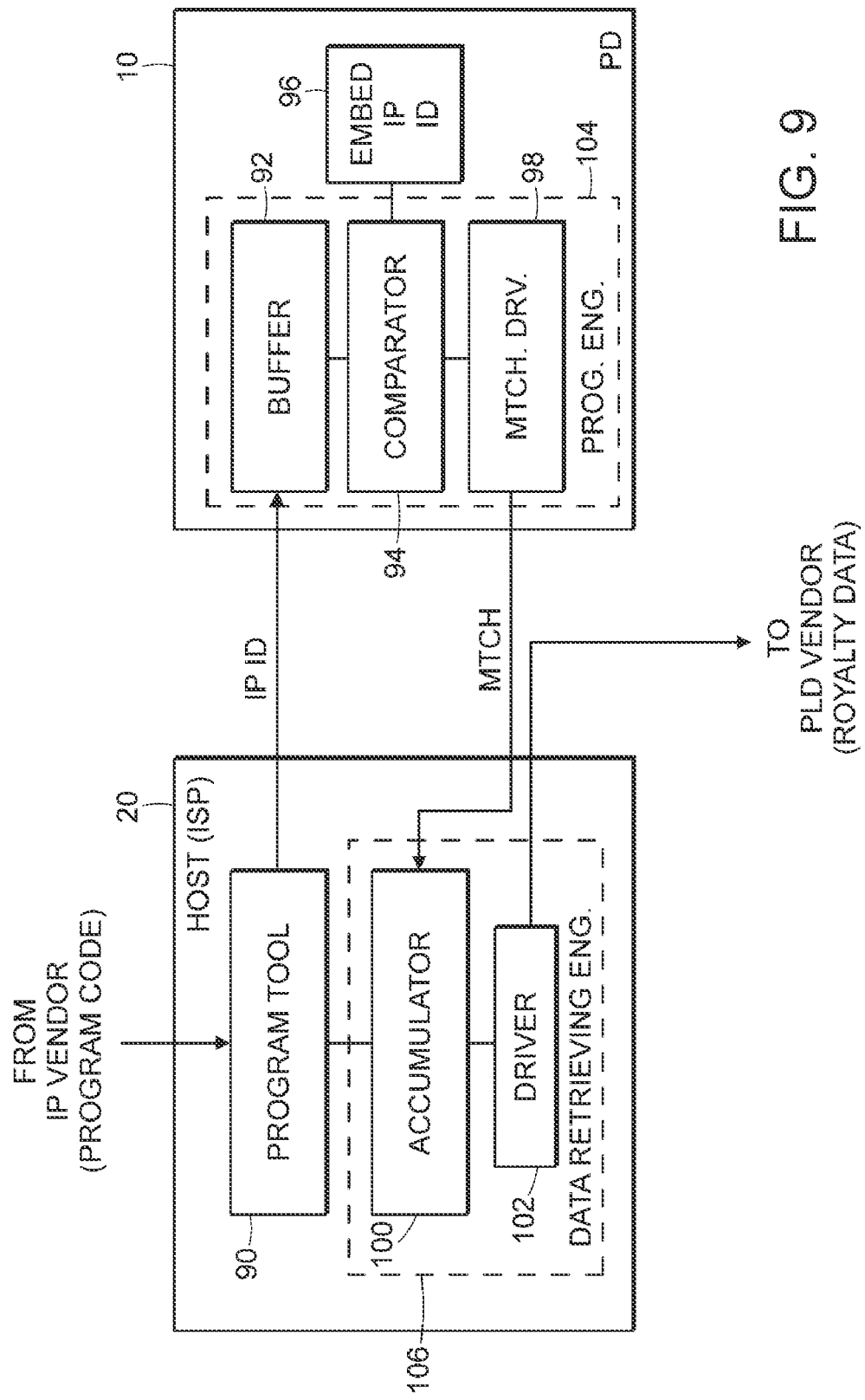
FIG. 9 is a block diagram of communication between a program engine within the programmable device and the data retrieving engine within the host.

FIG. 9 illustrates communication between a host and a programmable device at the user's site. Contained within host 20 is a program tool 90 that receives a program from an IP vendor. Along with the program code, is a software IP identifier that is sent to programmable device 10. Contained within programmable device 10 is a buffer 92 that temporarily stores the program code including the software IP ID. A comparator 94 will then compare the software IP ID with the hardware IP ID. The hardware IP ID, or embedded identifier, shown as item 96, is contained within a portion of the programmable device and pre-exists before the programmable device receives the software IP ID. If the comparator yields a match between the software IP ID and the hardware IP ID, then the match is driven from a driver 98 back to host 20. An accumulator 100 within host 20 will accumulate the number of programmable devices that produce a match. Thus, programmable device 10 is substituted for another programmable device, etc. until all of the desired programmable devices are programmed and the number of programmed programmable devices are registered within accumulator 100. That number is placed within the royalty payment table 80 (shown in FIG. 8) and sent to the programmable device vendor as royalty data via driver 102.

Contained within programmable device 10 is a program engine 104 that not only performs a comparison operation, but also indicates a match outcome. Contained within host 20 is a data retrieving engine 106 that not only receives the software IP ID from the IP vendor, but accumulates that ID and apportions it to the appropriate programmable devices being programmed if, and only if, a match occurs. Data retrieving engine 106, therefore, retrieves portions of the program code including the software IP ID, as well as the number of devices being programmed with that IP ID and corresponds the various value entries with each other in order to form the royalty payment table.

Figure 10:
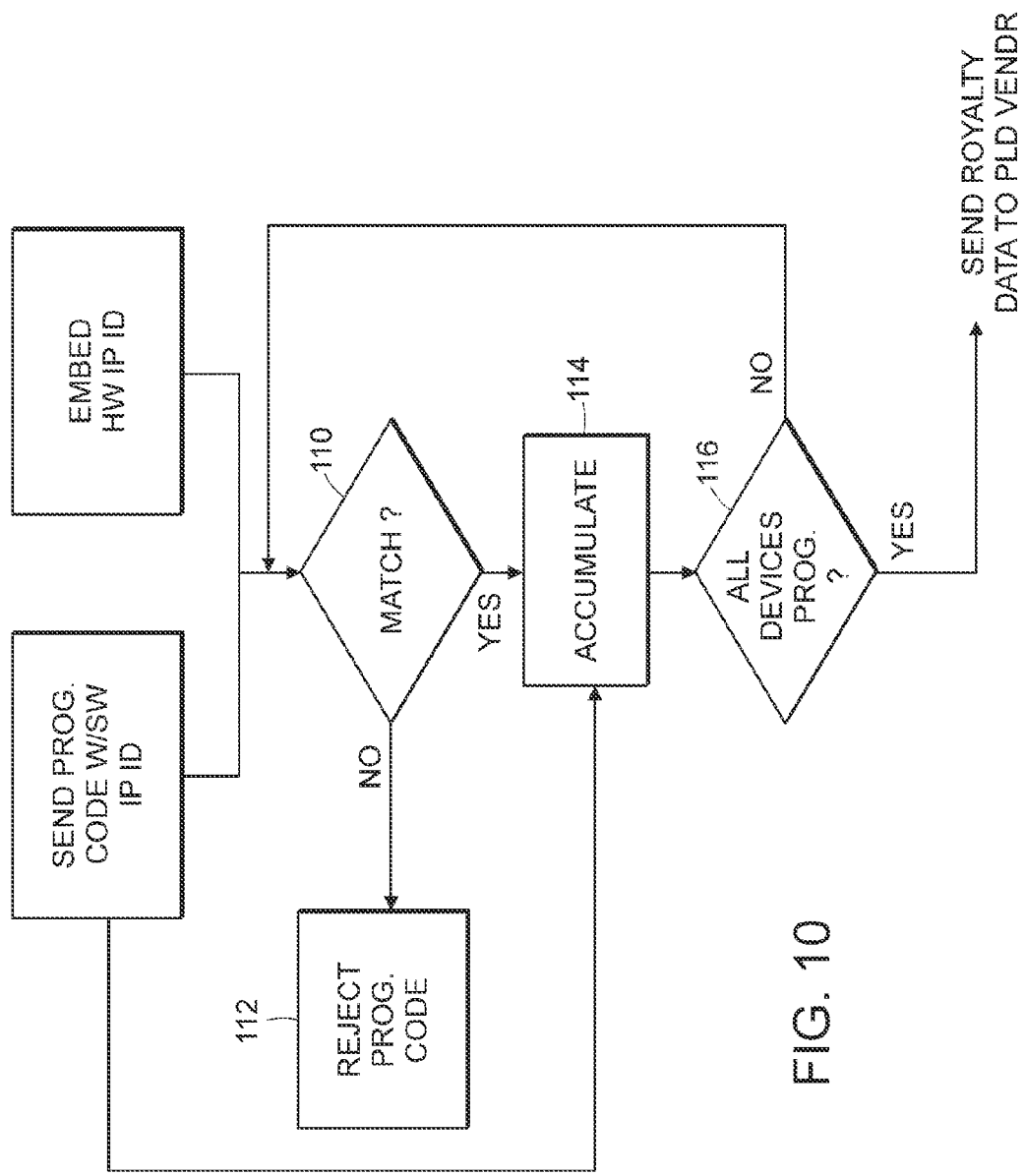
FIG. 10 is a flow diagram of the comparison between the embedded IP identifier and the software IP identifier, as well as an accumulate function for compiling the royalty data obligations of a programmable device vendor to an IP vendor.

FIG. 10 illustrates the flow operation of the present methodology. Both the program code containing the software IP ID and the embedded hardware IP ID are compared during match operation 110. If a match does not result, then the program code is rejected 112. The significance of rejecting the program code is to prevent unauthorized programming of a programmable device that does not either bear the appropriate hardware IP ID or the program code being used is unauthorized. The purpose of the match operation is to ensure authorized program code is being used and to ensure the IP vendor gets credit for program code usage.

If there is a match, then the matched IP ID along with its category, vendor name, and device number will be accumulated 114. The accumulate operation 114 will continue for all devices being programmed. Thus, if all devices have not been programmed, the process is repeated until all devices have been programmed as noted by decision block 116. Thus, each match operation will stimulate an accumulate operation which will continue until all of the programmable devices that incur a match will receive programming. The royalty data of the royalty payment table is then sent to the programmable device vendor so that he/she can forward the appropriate royalty payments to the various IP vendors shown in the royalty payment table. In the example of FIG. 8, the programmable device vendor will have to send funds to IP vendors A and B. Those funds represent the IP dollar value attributable to the IP category multiplied by the number of devices receiving a program.

It will be appreciated to those skilled in the art having the benefit of this disclosure that the embodiments described are believed applicable to any device which can be programmed at the customer's or user's site. Moreover, intellectual property (IP) is any value attributable to the design of products that are fashioned or configured from software sent to the customer or user site. Accordingly, the specification and drawings are to be regarded in an illustrative, rather than a restrictive sense as to possibly numerous such devices and program code variations which fall within the spirit and scope of the present invention.

What is claimed is:

1. A programmable logic device, comprising a comparator arranged upon the device for comparing embedded code also upon the device with a software identifier placed within a program used to program the device to a user-specified design, and for determining whether, when programmed, the device is configured to fall within the scope of one or more license obligations.

2. The device as recited in claim 1, wherein the embedded code is unalterable by the user of the device.

3. The device as recited in claim 1, wherein the embedded code is conveyed from a mask to a semiconductor topography bearing the device.

4. The device as recited in claim 1, wherein the embedded code is permanently programmed upon at least one non-volatile storage location of the device.

5. The device as recited in claim 1, wherein the embedded code comprises at least one bit that signifies said one or more license obligations between a vendor or licensor of intellectual property and a manufacturer of the device.

6. The device as recited in claim 5, wherein the embedded code is sent from the licensor of the intellectual property to the manufacturer of the device.

7. The device as recited in claim 1, wherein the software identifier comprises at least one bit that signifies said one or more license obligations between a vendor or licensor of intellectual property and a manufacturer of the device.

8. The device as recited in claim 1, wherein the software identifier is sent from the licensor of the intellectual property to the user of the device.

9. The device as recited in claim 1, wherein the license obligations are royalty payments due to a vendor or licensor of intellectual property, and wherein the program is used to configure the device to function within the scope of the intellectual property owned by the vendor or licensor.

* * * * *